US006774928B2

United States Patent
Bruzzone (10) Patent No.: US 6,774,928 B2
(45) Date of Patent: Aug. 10, 2004

(54) MOBILE FOR VIDEO-CONFERENCING

(75) Inventor: Raul Alberto Bruzzone, Le Mans (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 212 days.

(21) Appl. No.: 10/184,513

(22) Filed: Jun. 28, 2002

(65) Prior Publication Data

US 2003/0040333 A1 Feb. 27, 2003

(30) Foreign Application Priority Data

Jul. 3, 2001 (FR) .................................. 01 08819

(51) Int. Cl.[7] .............................................. H04N 7/14
(52) U.S. Cl. .................... 348/14.12; 348/14.02
(58) Field of Search ......................... 348/14.01–14.16; 455/556.1, 557; 379/93.01, 93.08

(56) References Cited

FOREIGN PATENT DOCUMENTS

JP        2000298724 A  * 10/2000   ............. G06T/5/20

* cited by examiner

Primary Examiner—Wing F. Chan
(74) Attorney, Agent, or Firm—Gregory L. Thorne (57) ABSTRACT

The present invention relates to an audio-visual communication device (SB) and an associated method. Said audio-visual communication device has two reception paths, one video (VRP_B) and one audio (ARP_B), said paths being suitable for receiving a video signal (VS) and an audio signal (AS), respectively, originating from a second audio-visual communication device (SA). Said device is characterized in that it comprises means of return control (CNTRL) suitable for adapting an image frequency (FR) of said video signal (VS) as a function of a noise signal.

8 Claims, 8 Drawing Sheets

MOBILE FOR VIDEO-CONFERENCING

The present invention relates to an audio-visual communication device comprising an audio reception path and a video reception path, said paths being suitable for receiving a video signal and an audio signal, respectively, originating from a second audio-visual communication device. The invention also relates to a communication method adapted to said device.

The invention has particular application in the field of mobile telephony.

The first edition of the journal "Wireless Communications & Mobile Computing" dated January–March 2001 describes a communication device, in this case a portable telephone currently referred to as a mobile, which comprises a screen, a camera and a radio reception module allowing communication with a second communication device by means of video-conferencing. Video-conferencing via a mobile telephone is a service designated as 3rd generation, described particularly in the standard IMT-2000 ("International Mobile Telecommunications") published by the ITU ("International Telecommunication Union"), and which is incorporated in said mobile.

During a conversation by video-conference between a user and another person, the user of a mobile will have difficulty hearing the voice of the other person if the latter is situated in a high level of ambient noise, said voice corresponding to a signal received by the audio reception path of said user's mobile. Consequently, this gives rise to poor understanding of the other person by the user. In order to resolve this problem, a solution would be to increase the volume of audio reception. However, by increasing the volume in this way, the noise is also amplified. In addition, this solution may be irksome if the user is not alone and wishes to keep the conversation confidential.

Accordingly, a technical problem to be resolved by the object of the present invention is to propose an audio-visual communication device comprising an audio reception path and a video reception path, said reception paths being suitable for receiving a video signal and an audio signal, respectively, originating from a second audio-visual communication device, and an associated method, which would in particular allow the quality of understanding between two users of audio-visual communication devices during a video-conference to be improved, without utilizing excessive resources in terms of data transmission, and without consuming excessive energy.

One solution to the technical problem posed is characterized, according to a first object of the present invention, in that the audio-visual communication device comprises:

means of return control suitable for adapting an image frequency of said video signal as a function of a noise signal, said audio signal comprising said noise signal.

According to a second object of the present invention, this solution is characterized in that the audio-visual communication method comprises a step:

for adapting an image frequency of said video signal as a function of a noise signal, said audio signal comprising said noise signal.

Thus, as will be seen in detail below, thanks to the means of control, the received video signal is improved when the received audio signal deteriorates. The basis for this is the principle by which a user of said audio-visual communication device better interprets what the other person says when he can see his face better and particularly when he can see his lips moving better. The interpretation of the received audio signal includes an error rate which is a function of the received video signal. The more fluid a sequence of frames corresponding to the video signal is, the easier the interpretation is.

These and other aspects of the invention are apparent from and will be elucidated, by way of non-limiting example, with reference to the embodiment(s) described hereinafter.

In the description which follows, the functions or structures that are well known to those skilled in the art will not be described in detail since they would encumber the description unnecessarily.

The present description of the invention refers to an example of an audio-visual communication device SB utilized in the field of mobile telephony. Said device SB is a cordless portable telephone also referred to as a mobile. The mobile is, for example, a mobile of the generation 2G+ or 3G based on the 2G+ communication standards such as GPRS ("General Packet Radio System") or EDGE ("Enhanced Data Rates for Gsm Evolution") published by the ETSI ("European Telecommunications Standard Institute"), or the 3G communication standards such as UMTS ("Universal Mobile Telecommunication System") or IMT-2000 ("International Mobile Telecommunication") published respectively by 3GPP ("Third Generation Partnership Protocol") and the ITU. These standards allow the existence of adequate data transmission rates and a high level of flexibility for multimedia communications such as communication by means of video-conferencing.

Figure 1:
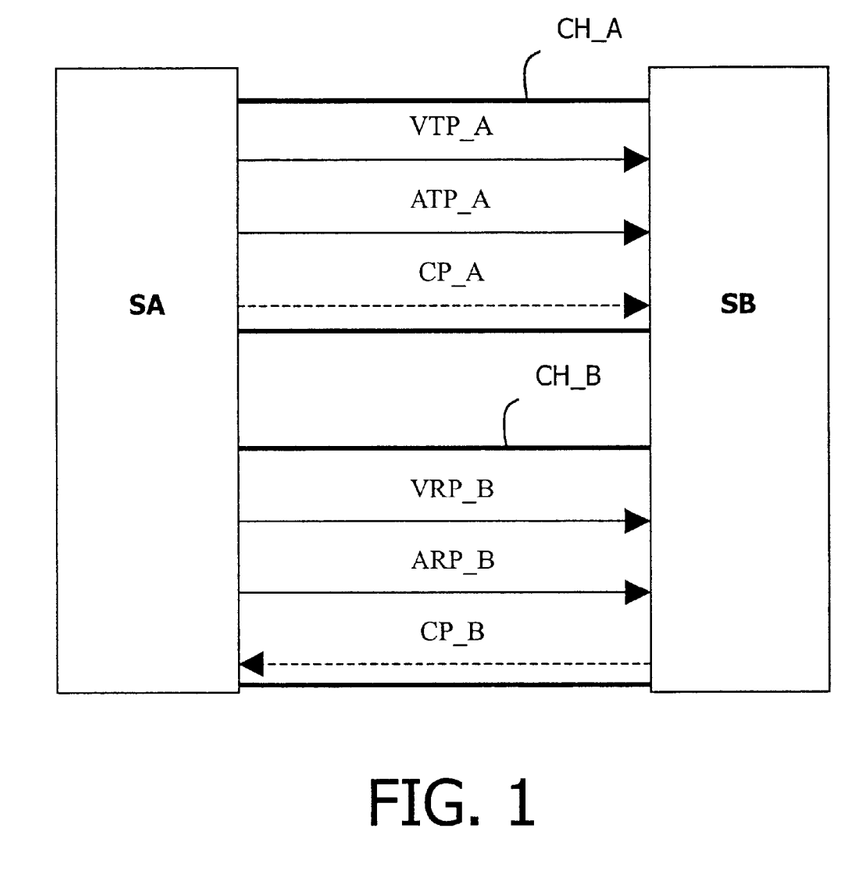
FIG. 1 shows an audio-visual communication device according to the invention in schematic form.

FIG. 1 illustrates a device SB of this kind in schematic form. It comprises a bi-directional channel CH_B made up of three sub-channels: an audio reception path ARP_B, a video reception path VRP_B and a control channel CP_B. The first two paths are suitable for receiving a video signal VS and an audio signal AS, respectively, originating from a second audio-visual communication device SA.

Figure 2:
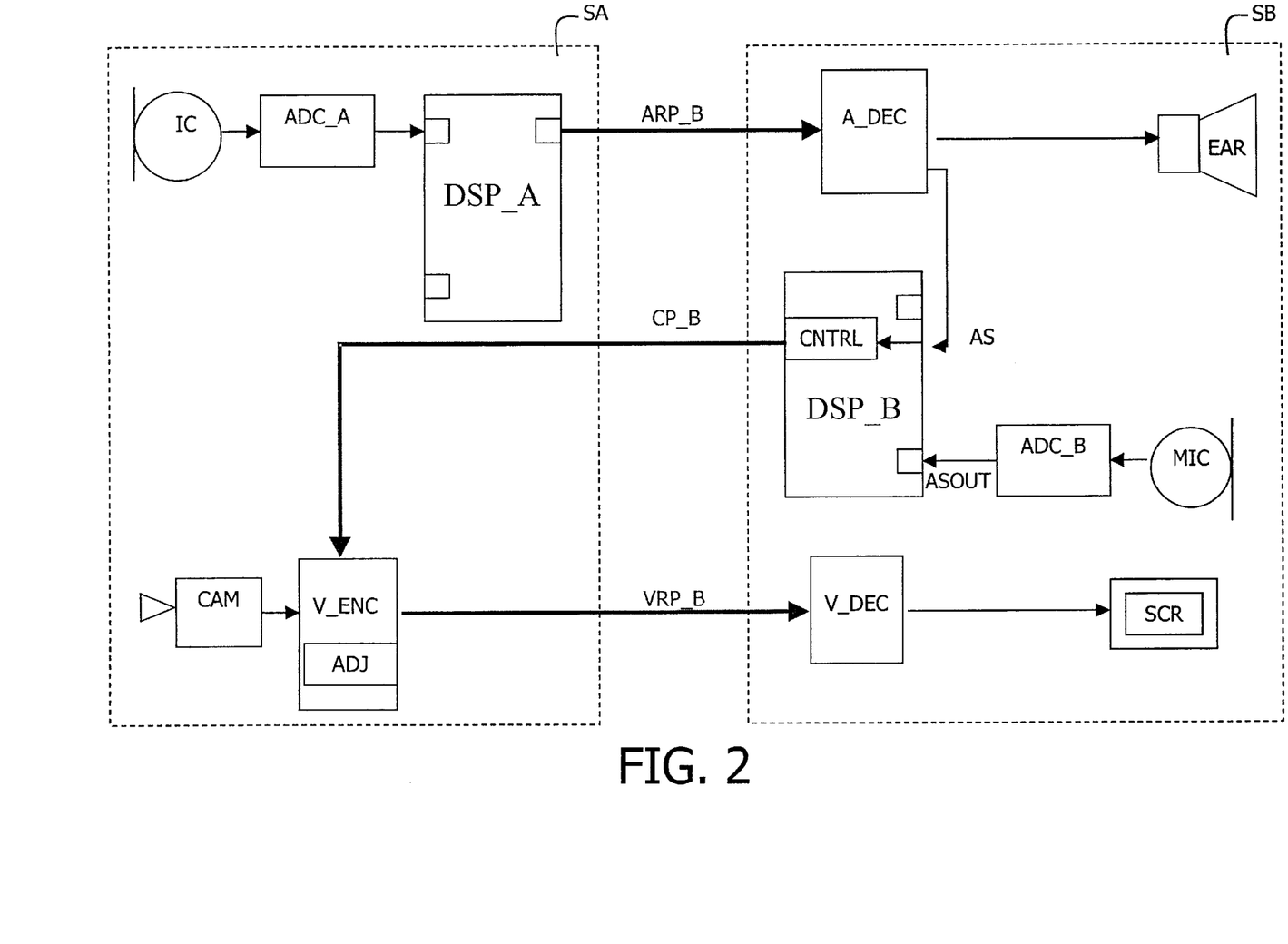
FIG. 2 is a diagram of components of the audio-visual communication device in FIG. 1.

Said audio-visual communication device SB also comprises a reception module which is made up of the following elements, as shown in FIG. 2:

- a processor DSP_B suitable for carrying out in particular digital audio signal coding well known to a person skilled in the art,
- an earpiece or loudspeaker EAR,
- a microphone MIC,
- an analogue to digital converter ADC_B, well known to a person skilled in the art, suitable for transforming an analogue signal coming from the microphone MIC into a digital signal ASOUT,
- an audio decoder A_DEC,
- a video decoder V_DEC,
- a video screen SCR, and
- means of control CNTRL suitable for adapting an image frequency of a video signal as a function of a noise signal, said video signal being received by the video reception path VRP_B and originating from a camera CAM of the second audio-visual communication device SA.

The second audio-visual communication device SA for its part also comprises a bi-directional channel CH_A made up of three sub-channels: an audio transmission path or sub-channel ATP_A, a video transmission path or sub-channel VTP_A and a control sub-channel CP_A. This second device SA also comprises a transmission module which is made up of the following elements:

- a processor DSP_A suitable for carrying out in particular digital audio signal coding,
- a microphone MIC,
- an analog to digital converter ADC_A suitable for transforming an analog signal coming from the microphone MIC into a digital signal,
- a video encoder V_ENC,
- means of adjustment ADJ of the image frequency of its video encoder V_ENC, and
- a video camera CAM.

In the remainder of this description, reference will be made without distinction to the first audio-visual communication device SB or the receiving part SB, on the one hand, and the second audio-visual communication device SA or the transmitting part SA, on the other hand.

The modules and elements illustrated in FIG. 2 allow a "voice+video" call to be set up by means of video-conferencing from the second communication device SA to the first communication device SB. For the sake of simplification, the modules and elements allowing an opposite operation (a call from the first mobile SB to the second mobile SA) have been omitted here.

During a video-conference, when the other person A speaks on his mobile SA next to its microphone MIC, at the same time, a sequence of frames showing the face of said other person A is recorded by the video camera CAM and sent to a user B of the first mobile SB. Said first mobile SB receives a video signal VS by means of its video reception path VRP_B, said video signal corresponding to the sequence of frames sent, and at the same time, an audio signal AS by means of its audio reception path ARP_B. Consequently, the user B hears the other person A by means of the earpiece EAR and sees him by means of his video screen SCR on which the sequence of frames is displayed.

In a quiet setting, there are few communication problems between the user B and the other person A. However, in a noisy setting, when the other person A is situated in a street where vehicles are frequently passing, for example, the user B will have difficulty in understanding him.

In order that the user B understands the other person A better, the first audio-visual communication device SB comprises means of return control CNTRL suitable for adapting an image frequency of the video signal VS as a function of a noise signal, the audio signal AS comprising said noise signal NS and a speech signal AS_1. Thus, when the other person A is speaking, the audio signal AS comprises a "speech signal" and an ambient noise signal NS. When the other person A is not speaking, the audio signal AS comprises only an ambient noise signal NS. In the remainder of this description, reference will be made without distinction to the noise signal or the noise and the current image frequency FRc for the image frequency sent by the second communication device SA to the first communication device SB.

The adaptation of the image frequency of a video signal VS is carried out in accordance with the following steps.

In a first step 1), the ambient noise NS interfering with the second mobile SA of the other person A is evaluated. Since the ambient noise NS is the same whether the other person A is speaking or not, for further obvious reasons of simplification, the ambient noise when the other person A is not speaking is evaluated.

In a first sub-step 1a), at least one time interval when the other person A is not speaking is identified, i.e. at least one time interval during which only a noise signal NS is received by the first audio reception path ARP_B or during which no speech signal AS_1 is received by the first audio reception path ARP_B.

FIGS. 3a to 3f illustrate this identification.

Figure 3A:
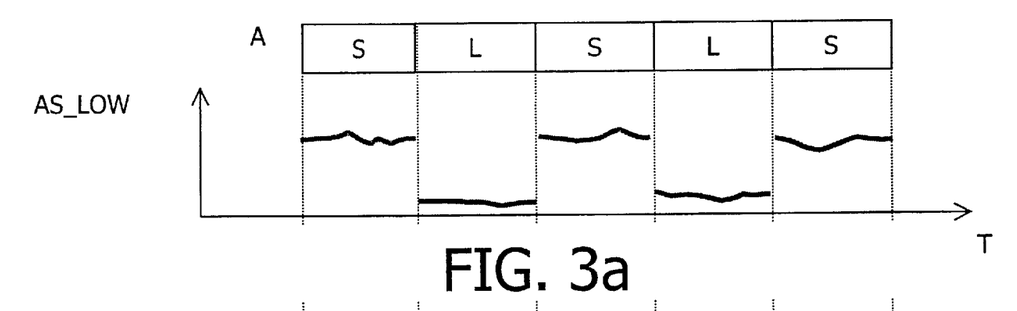
FIG. 3a is a diagram of a reception cycle of an audio signal by the audio-visual communication device in FIG. 1 during minor interference.

FIG. 3a is a diagram of a reception cycle of an audio signal AS_LOW by the first audio-visual communication device SB during minor interference or low ambient noise NS, for example, when it is raining gently where the other person A is situated. This audio signal AS_LOW corresponds to time intervals of speaking S/listening L of the other person A.

Empirically, on average, the other person A speaks 35% to 40% during a given time cycle, and listens 60%–65% during this same time cycle. For reasons of simplification, a cycle of 50%/50% intervals is considered as shown in FIG. 3a.

Figure 3B:
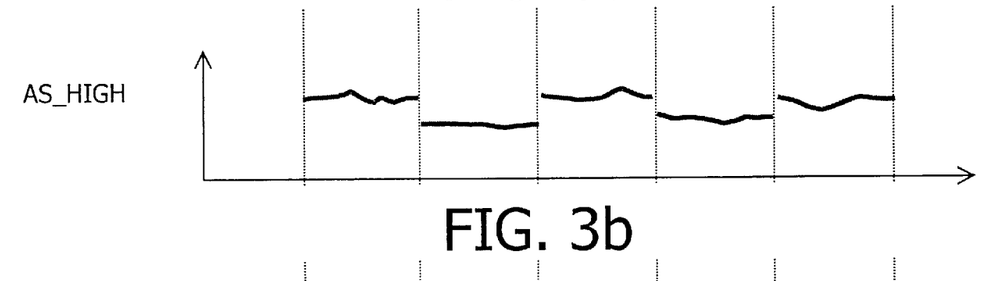
FIG. 3b is a diagram of a reception cycle of an audio signal by the audio-visual communication device in FIG. 1 during major interference.

FIG. 3b is a diagram of a reception cycle of an audio signal AS_HIGH by the first audio-visual communication device SB during major interference or high ambient noise NS, when cars are passing frequently in the street where the other person A is walking, for example.

Figure 3C:
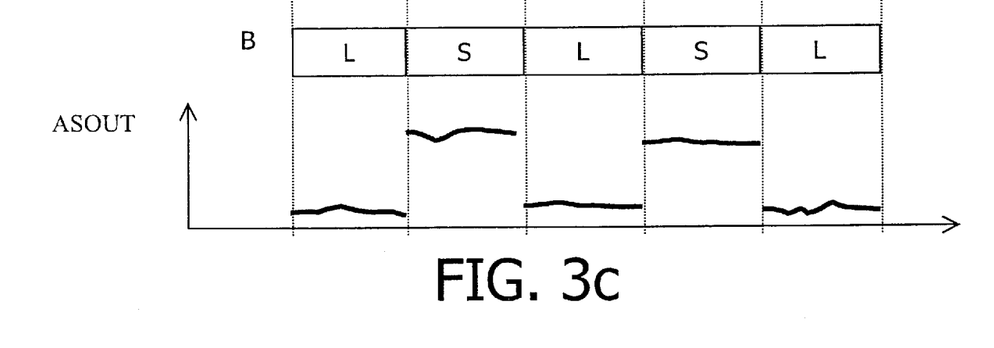
FIG. 3c is a diagram of a transmission cycle of an audio signal by the audio-visual communication device in FIG. 1.
Figure 3D:
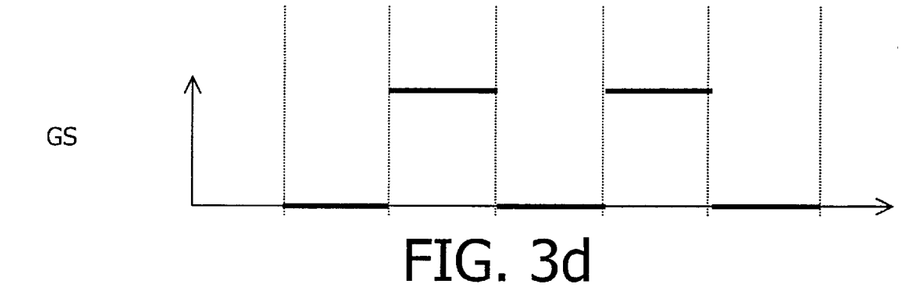
FIG. 3d is a diagram of a cycle of a threshold signal determined from the transmission cycle of the audio signal in FIG. 3c.

FIG. 3c is a diagram of a transmission cycle of an audio output signal ASOUT by the first audio-visual communication device SB. This audio output signal ASOUT is generated by the converter ADC_B from an audio signal originating from the microphone MIC.

It is assumed that the user B and the other person A do not speak at the same time. As can be seen with regard to the foregoing Figures, the speaking intervals S of the user B correspond to the listening intervals L of the other person A and vice versa. Consequently, determining the time intervals when only a noise signal NS is received by the first reception path ARP_B corresponds to determining the time intervals when an audio output signal ASOUT is normally transmitted by the first communication device SB to the second communication device SA, i.e. during the speaking time intervals S of the user B.

These time intervals S are determined in the following manner. When the user B is speaking, the audio output signal ASOUT displays a high level of intensity. Said signal ASOUT also comprises a speech signal ASOUT_1 and a noise signal NSOUT. The speech signal ASOUT_1 has greater intensity here than the noise signal NSOUT. In the opposite case, when the user B is listening, the output signal ASOUT displays a low level of intensity. The difference in the levels of intensity allows the listening and speaking time intervals L and S, respectively, of the user B to be determined on the one hand, and, by means of the processor DSP_B, a threshold signal GS shown in FIG. 3d to be generated on the other hand. The threshold signal GS is equal to 1 during a speaking time interval S of the user B (which corresponds to a listening time interval L of the other person A), and it is equal to 0 during a silent interval L of the user B (which corresponds to a speaking interval S of the other person A).

Figure 3E:
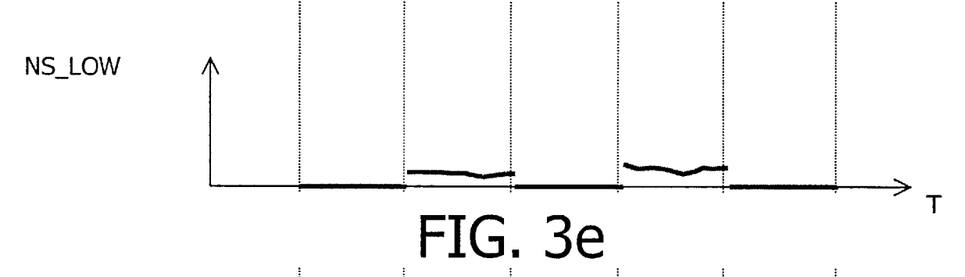
FIG. 3e is a diagram of a signal resulting from filtering of the audio signal in FIG. 3a by the threshold signal in FIG. 3d during minor interference.
Figure 3F:
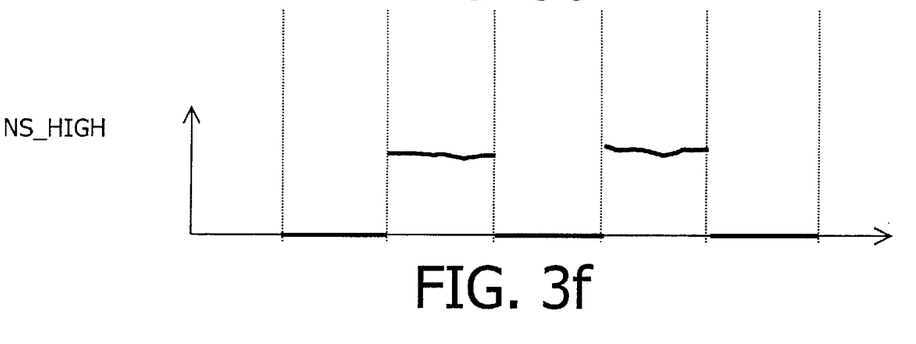
FIG. 3f is a diagram of a signal resulting from filtering of the audio signal in FIG. 3b by the threshold signal in FIG. 3d during major interference.

Having determined the time intervals when the other person A is not speaking, in a second sub-step 1b), the noise signal NS is isolated, by means of the threshold signal GS, from an audio signal AS originating from the second communication device SA during the listening time intervals L of the other person A. To this end, the audio signal AS originating from the second communication device SA and received by the first reception path ARP_B is filtered by means of said threshold signal GS. FIG. 3e shows a noise signal NS_LOW resulting from filtering of the audio signal AS_LOW in FIG. 3a by the threshold signal GS. FIG. 3f shows a noise signal NS_HIGH resulting from filtering of the audio signal AS_HIGH in FIG. 3b by the threshold signal GS.

It will be noted that this filtering is carried out by way of advantage at the first communication device SB since it is easier to detect the time intervals when the other person A is not speaking on the side of the receiving part SB as has been seen in the foregoing.

In a third sub-step 1c), since the ambient noise NS interfering with the second mobile SA varies over time, a mean noise level NSm is calculated. This mean noise level NSm is calculated from a sequence $SQ_{SAMP}$ of samples SAMP of noise, said samples SAMP being evaluated by the communication device SB. For example, sampling can be carried out at 1 kHz.

Figure 4:
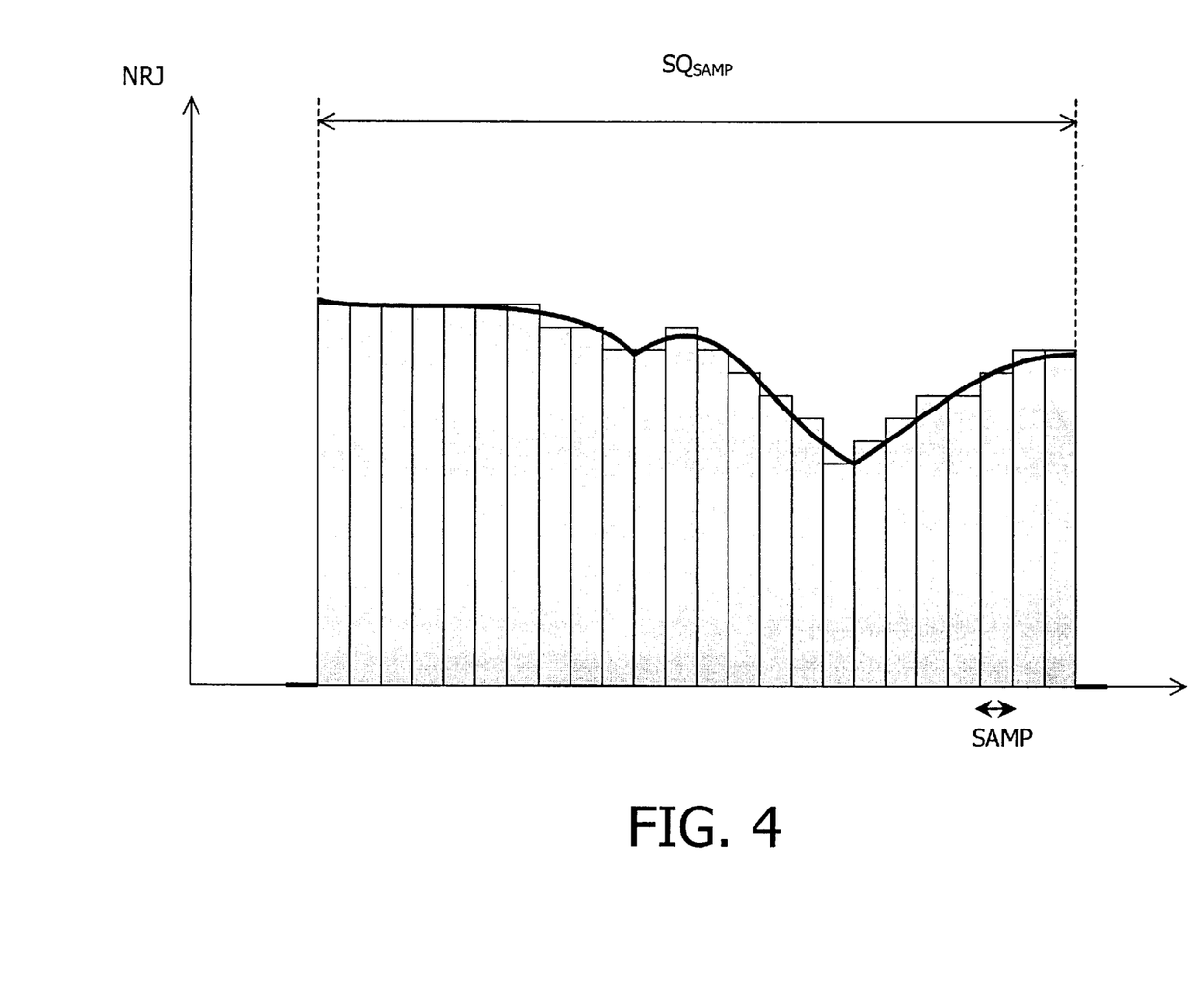
FIG. 4 shows a noise signal sampled by the audio-visual communication device in FIG. 1 and originating from a second audio-visual communication device.

The sequence $SQ_{SAMP}$ of samples is shown in the graph in FIG. 4. The graph comprises a vertical axis NRJ showing the energy of the noise NS on the side of the transmitting part SA calculated from the side of the receiving part SB, and a horizontal axis representing time T.

Figure 5:
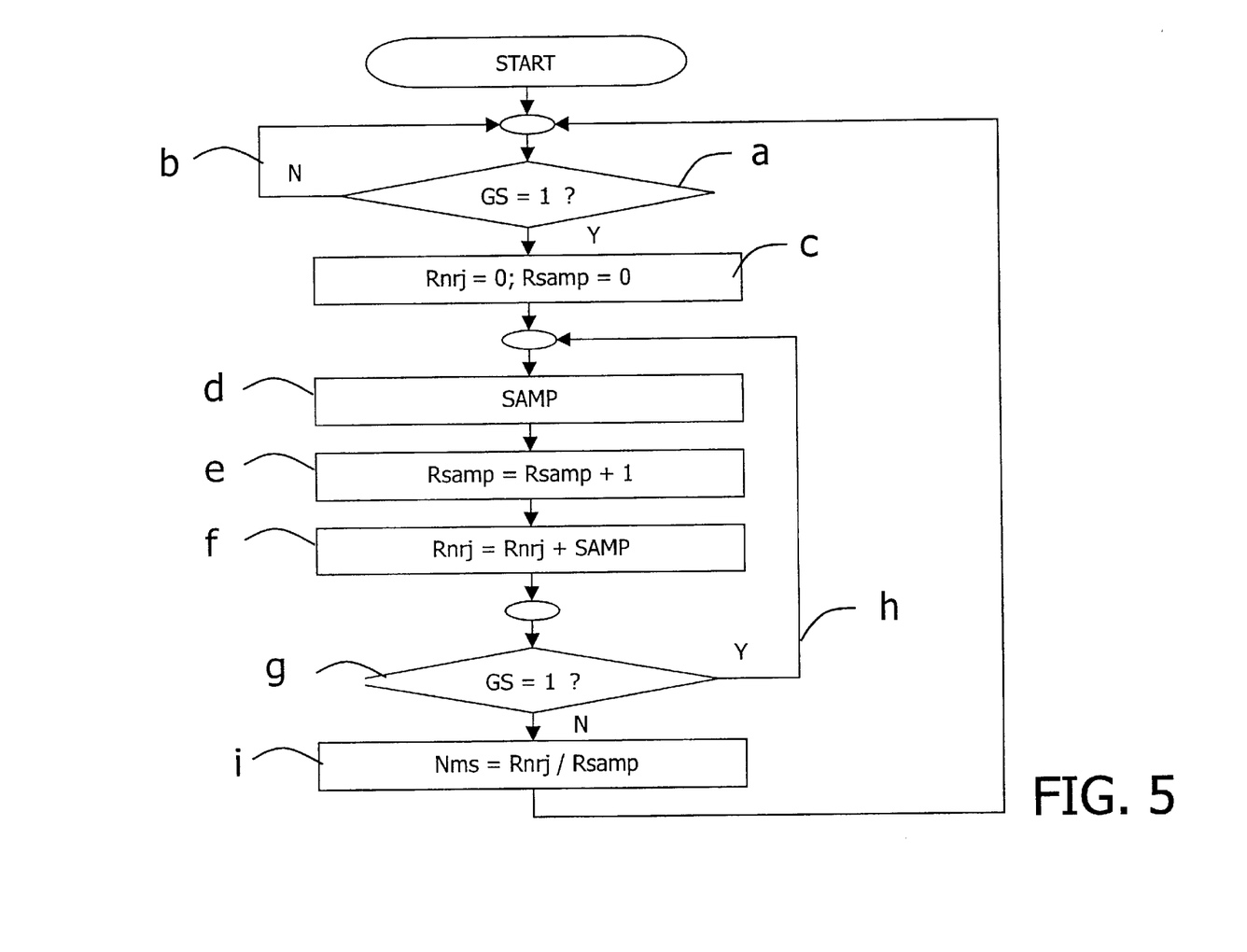
FIG. 5 is a flowchart of a sampling algorithm for the noise signal in FIG. 4.

The calculation of the mean noise NSm is carried out by means of the processor DSP_B in accordance with the steps shown in the flowchart in FIG. 5.

a) The threshold signal GS is tested to see whether it is equal to 1 (is the other party A speaking or not?),
b) If GS is equal to 0, go back to a) (the other party A is speaking),
c) If not, (the other party A is not speaking), two registers Rnrj and Rsamp of the processor DSP_B are initialised at 0. The first register Rnrj allows the energy of all the samples utilized to calculate the mean noise NSm to be aggregated while the second register Rsamp allows the number of samples SAMP utilized to be calculated.
d) A sample SAMP is taken from the sequence of samples $SQ_{SAMP}$,
e) The number of samples SAMP taken is aggregated (Rsamp=Rsamp+1),
f) The energy of the samples taken is aggregated (Rnrj= Rnrj+SAMP),
g) The threshold signal GS is tested to see whether it is equal to 1,
h) If so, go back to d) (while the other party A is not speaking, the energy is aggregated),
i) If not, the threshold signal GS is equal to 0 (the other party A has begun speaking again), and a value for the mean noise NSm is calculated such that NSm=Rnrj/ Rsamp, and
return to a).

The value for the mean noise NSm calculated in this way is a reference value until the next cycle when the threshold signal GS is equal to 1 again.

It will be noted that preferably, calculation by the receiving part SB of the mean noise NSm existing on the side of the transmitting part SA is carried out in a continuous manner.

In a second step 2), a check is carried out to ensure that the video signal VS sent by the video encoder V_ENC of the transmitting part SA is properly adapted to said noise NSm.

It has been demonstrated empirically, in an article entitled "User evaluation: synthetic talking faces for interactive services" written by I. Pandzic, J. Osterman and D. Millen, and published by "Springer Verlag 1999" in the journal "The Visual Computer", that a video signal VS is properly adapted to a noise signal NSm of this kind if it comprises an image frequency FR that increases with said noise.

Figure 6:
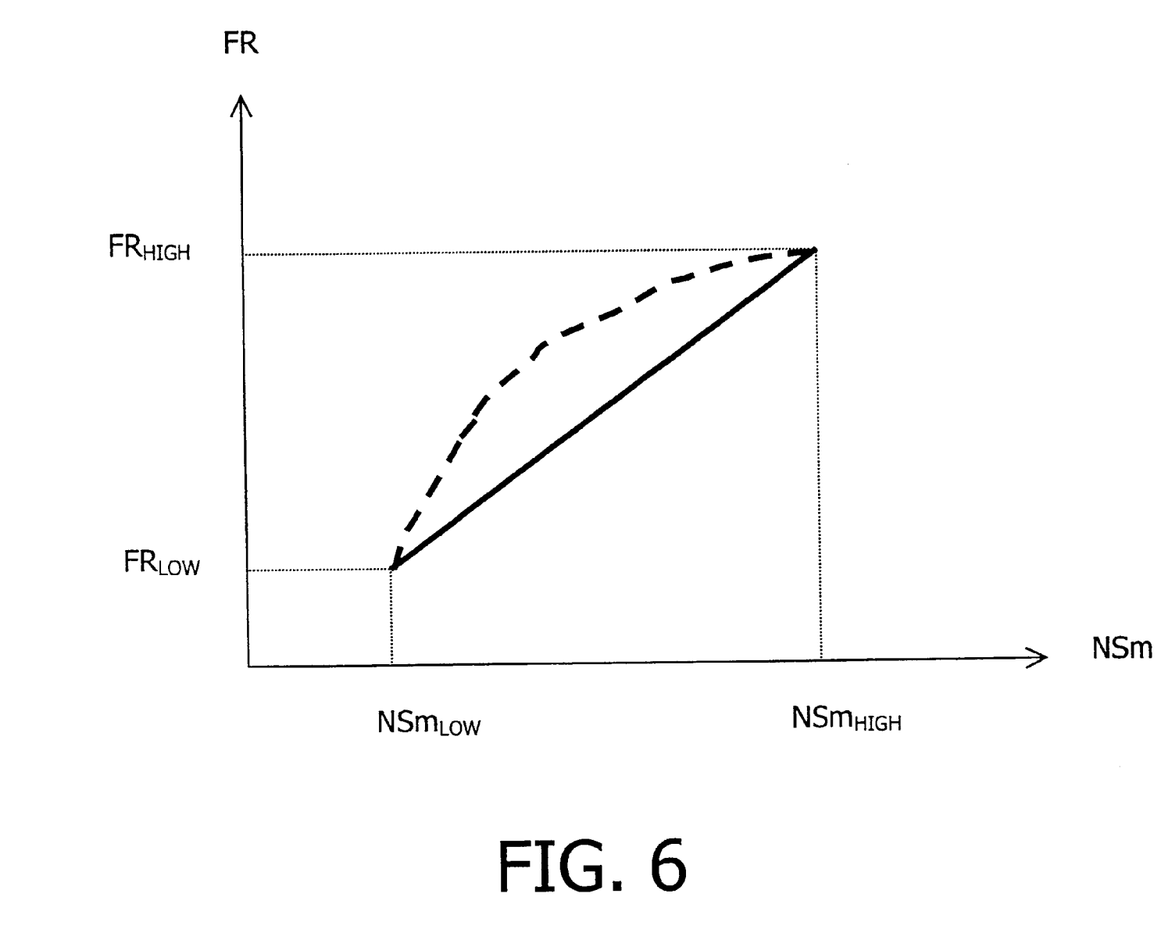
FIG. 6 illustrates an image frequency of a video signal received by the audio-visual communication device in FIG. 1 adapted to a noise signal.

The graph in FIG. 6 shows an example of an empirical function FR(NSm). When the mean noise is low $NSm_{LOW}$, the image frequency FR can be limited to a reduced value $FR_{LOW}$ without major subjective degradation of the information in the received video signal VS and the received audio signal AS. In this case, the user B still understands the other person A by relying on what he hears and what he sees at the same time. Conversely, when the mean noise is high $NSm_{HIGH}$, the image frequency FR must be large.

Typical values for the image frequency FR at the two ends of the graph are $FR_{LOW}$=10 fps and $FR_{HIGH}$=30 fps (frames per second).

It will be noted that in order to establish an empirical function of this kind, according to a non-limitative embodiment, tests are carried out on a group of 10 subjects, for example. The first subject represents the user B. He looks at an image showing another person A on the screen of a mobile. A monologue by the other person A is simulated. The starting point is the smallest frequency $FR_{LOW}$ and a noise NS is simulated. The simulated noise is selected as a function of the environment in which the mobile to be simulated is situated. The starting point is low noise. The first subject determines whether he can understand what "the other person A" is saying. If he can understand, the noise is increased until he can no longer understand him. The initial point of the empirical function FR(NS) is determined in this way. Subsequently, the image frequency FR is progressively increased by increments of 5 frames per second, for example. At each increment, the issue of whether the first subject can understand what "the other person A" is saying is determined. If he can understand him, the noise is increased until he can no longer understand. Other points of the empirical function FR(NS) are determined in this way etc. The same test is carried out with the other subjects. A good representation of the empirical function FR(NS) will thus be obtained.

In order to carry out the check, in a first preferred embodiment, the empirical function FR(NS) is recorded in a table LUT of correspondences included in a memory (not shown) of the processor DSP_B of the receiving part SB.

The memory is non-volatile, and preferably rewritable. The table LUT thus includes the ideal image frequencies FR corresponding to different values of ambient noise NSm which can be calculated.

In a second embodiment, the empirical function FR(NS) is represented by the processor DSP_B in the form of a non-linear function such as a logarithmic or polynomial function of the type y=mx+n. This non-linear form is symbolised, for example, by the dotted line in the graph in FIG. 6.

It will be noted that the empirical function FR(NS) is in particular dependent on the environment, on technical characteristics of noise sensors, voice and video encoders, and on the development of techniques of video communication. The empirical function FR(NS) can thus be modified in the memory of the processor.

It will be noted that said check is preferably carried out in a continuous manner as for the calculation of the mean noise NSm.

It will be noted that in a case where there would be far too much ambient noise NS on the side of the other person A, this second step 2) is not carried out. Thus, for example, there is too much noise if the isolated noise NS is greater than 10 dB.

In a first non-limitative embodiment, nothing is done subsequently, since in this case it wouldn't be much use.

In a second non-limitative embodiment, the smallest frequency $FR_{LOW}$ is adopted, since less bandwidth will thus be consumed during the transmission of a sequence of images, and as a result this will cost less.

It will also be noted that in a case where there would be too much noise on the side of the user B, nothing is done since there would be too many problems in calculating the threshold signal GS. Also, in this case, neither the sub-steps 1a) to 1c), nor the second step 2), are carried out. Thus, for example, there is too much noise when the standard deviation between the noise on the side of the user B and the audio signal on the side of said user B is preferably equal to 10 dB.

In a third step 3), an image frequency $FR_{TRANS}$ adapted to said calculated noise NSm is calculated, which, as a result, allows the quality of a video-conferencing call to be adapted as a function of the ambient noise. The calculation is carried out by means of the empirical function FR(NS).

In a fourth step 4), the receiving part SB sends the adapted image frequency $FR_{TRANS}$ to the transmitting part SA via the control channel CP_B.

Figure 7:
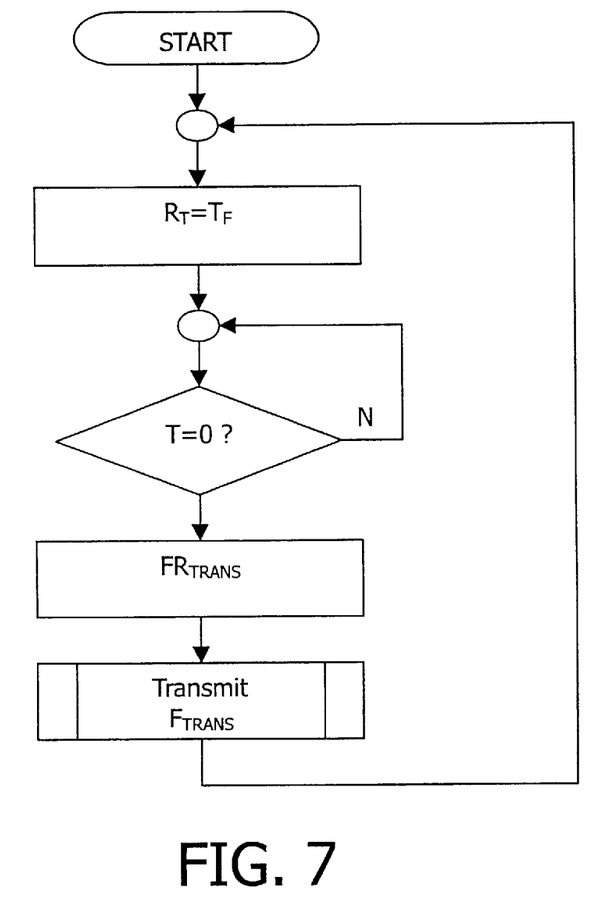
FIG. 7 is a flowchart of an algorithm implemented in the means of control of said audio-visual communication device in FIG. 1.

In accordance with a first non-limitative embodiment referred to as "circuit mode", the receiving part SB reserves the control channel CP_B for certain periods of time with a view to sending the adapted image frequency $FR_{TRANS}$, by way of the means of channel reservation/release MM. Said means MM are preferably included in the means of return control CNTRL. Said means of channel reservation/release MM send messages FRM in particular to the transmitting part SA. The sending of messages FRM takes place periodically, as shown in FIG. 7.

At the start of a periodic cycle, the receiving part SB initialises a period register $R_T$ at a period $T_F$. The period $T_F$ represents a period of time which elapses between two sendings of the adapted image frequency $FR_{TRANS}$, once a period of time of a period $T_F$ has elapsed, the receiving part SB calculates a value for the adapted image frequency $FR_{TRANS}$ in accordance with step 3, then, the receiving part SB sends a first message FRM1 to reserve the control channel CP_B, the receiving part SB transmits said value $FR_{TRANS}$ via the control channel CP_B to the transmitting part SA, the transmitting part SA receives the value $FR_{TRANS}$ at its encoder V_ENC. The latter matches its current image frequency FRc to the new adapted image frequency $FR_{TRANS}$ received, and the receiving part SB sends a second message FRM2 to release the control channel CP_B, another cycle starts.

Thus, in accordance with this first embodiment, the image frequency $FR_{TRANS}$ adapted to the ambient noise NS of the second communication device SA is always transmitted to said second communication device.

It will be noted that the period $T_F$ is preferably selected with a view to optimising the communication between the two parts SA and SB. For example, in the case of communication based on the UMTS standard, a multiple of 10 ms is selected, the 10 ms corresponding to the duration of a data frame sent on a channel. This circuit mode can also be applied to the EDGE standard.

In accordance with a second non-limitative embodiment referred to as "packet mode", when the receiving part SB detects a significant change in the ambient noise NS on the side of the transmitting part SA—when a difference of 3 dB exists between two calculated noise values, for example—it calculates a value for the adapted image frequency $FR_{TRANS}$ in accordance with step 3.

In accordance with a first variant of this second embodiment, if the current image frequency FRc of the video signal VS received by the receiving part SB is equal to or greater than the adapted image frequency $FR_{TRANS}$ which has been calculated, nothing is done since in this case there is good understanding of the other person A by the user B. If the current image frequency FRc is less than the adapted image frequency $FR_{TRANS}$, there is a problem of understanding and the following steps are carried out:

A) The receiving party SB sends a first message FRM1 to a base station BS (not shown) asking to send a packet. The latter base station allows it to send a packet if it has unoccupied resources (gaps in which the base station is available for sending packets), B) in this case, a communication link is established for a time interval equal to the number of data items to be sent, in this case the calculated adapted image frequency $FR_{TRANS}$, being a certain number of frames per second, C) subsequently, the packet comprising said frequency $FR_{TRANS}$ is sent to the transmitting part SA via the base station BS, D) the transmitting part SA receives the value $FR_{TRANS}$ at its encoder V_ENC. The latter matches its current image frequency FRc to the new adapted image frequency $FR_{TRANS}$ received.

In accordance with a second variant of this second embodiment, if the current image frequency FRc of the video signal VS received by the receiving part SB is different from the adapted image frequency $FR_{TRANS}$ which has been calculated, the steps A), B), C) and D) quoted above are carried out.

This second embodiment applies, for example, in the case of communication based on the standards GPRS, EGPRS ("Enhanced GPRS") or UMTS. This second mode is more powerful than the first mode in terms of utilization of radio resources. Consequently, from the economic viewpoint, this mode will generally be less expensive than a circuit mode of the same mean capacity, since communication will be billed as a function of the volume of data transmitted and no longer as function of the duration of communication. The greater the volume of data, the less expensive communication will be in packet mode.

It will be noted that, by way of advantage, the second audio-visual communication device SA comprises means of adjustment ADJ of the current image frequency FRc of its video encoder V_ENC as a function of the adapted image frequency $FR_{TRANS}$ sent by the first audio-visual communication device SB, the latter frequency being a function of the noise signal NS. These means of adjustment ADJ are, for example, implemented in a program loaded in the processor DSP_A, said program being suitable for changing a refresh rate of an image by increasing or reducing a scanning time associated with each pixel included in said frame.

Thus, according to the present invention, the receiving part SB can instruct the transmitting part SA to increase or reduce the current frequency FRc of the images which it sends to it in accordance with the ambient noise NS. When the ambient noise NS is large, the number of images sent and therefore the quality of understanding between the user B and the other person A is increased. The user B sees the other person A better on the screen SCR of his mobile, and particularly his lips. As a result, the user B will interpret what the other person A is saying with a lower error rate than if he could not see him as well.

It will be noted that the adaptation of the current image frequency of the video signal VS received by the first video reception path VRP_B can also be carried out as a function of an audio signal AS to noise NS ratio. However, this adaptation is more complex. In addition, the assumption has been made that the other person A speaks at a constant distance from his mobile SA. As a result, the associated speech signal possesses a virtually constant mean energy. Consequently, there is no need to take the speech signal and therefore the whole of the audio signal into account during this adaptation.

As stated in the foregoing, for reasons of simplification, the present invention only describes a unidirectional communication system SYS comprising, on the one hand, a first audio-visual communication device SB suitable for receiving an audio signal AS and a video signal VS, and, on the other hand, a second audio-visual communication device SA suitable for transmitting said audio signal AS and said video signal VS. It is understood that said communication system is bi-directional. The second device SA is also suitable for receiving audio and video signals, and the first device is also suitable for transmitting audio and video signals of this kind. In addition, by way of advantage, the second audio-visual communication device SA also comprises means of control, identification, calculation and reservation/release identical to those of the first device, in order that the other person A can understand the user B better on his side when there is noise on the side of the user B, without consuming excessive resources and energy.

Thus, in accordance with the foregoing, the bi-directional audio-visual communication system SYS comprises a first audio-visual communication device and a second audio-visual communication device, said devices each comprising an audio reception/transmission path and a video reception/transmission path, said paths being suitable for receiving/transmitting an audio signal and a video signal, respectively. In addition, said system SYS comprises at least one control channel CP, said channel being suitable for routing an image frequency FR of a video signal VS sent by the first communication device to the second communication device, said frequency being adapted as a function of a noise signal NS included in an audio signal AS, said video signal VS and said audio signal AS having been sent by said second communication device to said first communication device.

Thus, the invention described has the advantage of improving communication between two users of audio-visual communication devices.

A second advantage is that, by virtue of the present invention, it is possible to achieve a lower consumption of energy at the mobile. In fact, when there is little noise, it is not absolutely necessary to send a sequence of images at a frequency of 30 fps. It is sufficient to utilize an image frequency of 10 fps, for example. Thus, in this case, a battery of a mobile will run down less quickly. In circuit mode, the optimum minimum frequency is always applied. Thus, the consumption of energy is always adapted to what is needed.

Finally, a third advantage is a possible lowering of financial costs. In fact, given that the image frequency can be regulated as a function of the noise, in circuit mode, it is less expensive to transmit a sequence of frames at 10 fps, for example, than at 30 fps. This is why the frequency utilized is always the smallest optimum frequency possible, without communication suffering as a result, of course. In packet mode, the first variant or the second variant can be chosen. For example, if communication is less expensive when there is a large volume of data, there will be a tendency to adopt the first variant.

Naturally, the invention is by no means limited to the field of mobile telephony. The invention has been described particularly for cordless portable audio-visual communication devices in the field of mobile telephony, since they are often subjected to ambient noise which cannot be easily reduced. However, the invention can extend to other fields, particularly the fields of multimedia communication between fixed communication devices.

Naturally, the context of the invention is by no means limited to the embodiments described in the foregoing and variations or modifications can be made to them without thereby departing from the spirit and scope of the invention.

No reference in the present text must be interpreted as limiting said text.

The verb "comprise" and its conjugated forms must similarly not be interpreted in a limitative manner, i.e. they must not be interpreted as excluding the presence of any steps or elements other than those defined in any claim, or as excluding a plurality of steps or elements already listed after said verb and preceded by the article "a" or "an".

What is claimed is:

1. An audio-visual communication device (SB) comprising an audio reception path (ARP_B) and a video reception path (VRP_B), said paths being suitable for receiving a video signal (VS) and an audio signal (AS), respectively, originating from a second audio-visual communication device (SA), characterized in that it comprises means of return control (CNTRL) suitable for adapting an image frequency (FR) of said video signal (VS) as a function of a noise signal (NS), said audio signal (AS) comprising said noise signal (NS).

2. An audio-visual communication device as claimed in claim 1, characterized in that it also comprises means of identification (GS) of at least one time interval (L) during which only a noise signal (NS) is received by the audio reception path (ARP_B).

3. An audio-visual communication device as claimed in claim 1, characterized in that it also comprises means of calculating a frequency (FR) adapted to said noise signal (NS).

4. An audio-visual communication method being suitable for utilizing an audio reception path (ARP_B) and a video reception path (VRP_B), said paths being suitable for receiving a video signal (VS) and an audio signal (AS), respectively, originating from a second audio-visual communication device (SA), characterized in that it comprises a step of adapting an image frequency (FR) of said video signal (VS) as a function of a noise signal (NS), the audio signal comprising said noise signal (NS).

5. An audio-visual communication method as claimed in claim 4, characterized in that the adaptation step comprises a sub-step:

of identifying at least a time interval (L) during which only a noise signal (NS) is received by the audio reception path (ARP_B).

6. An audio-visual communication method as claimed in claim 4, characterized in that the adaptation step comprises an additional sub-step:

of calculating a frequency (FR) adapted to said noise signal (NS).

7. An audio-visual communication device (SA) comprising an audio transmission path (ATP_A) and a video transmission path (VTP_B), said paths being suitable for transmitting a video signal (VS) and an audio signal (AS), respectively, to a first audio-visual communication device (SB), characterized in that it comprises means of adjustment (ADJ) of a current image frequency (FRc) of said video signal (VS) as a function of an image frequency (FR) sent by said first audio-visual communication device (SB), the latter frequency being a function of a noise signal (NS), said audio signal (AS) comprising said noise signal (NS).

8. An audio-visual communication system (SYS) comprising a first audio-visual communication device (SB) and a second audio-visual communication device (SA), said devices each comprising an audio reception/transmission path and a video reception/transmission path, said paths being respectively suitable for receiving/transmitting an audio signal and a video signal, characterized in that it comprises at least one control channel (CP), said channel being suitable for routing an image frequency (FR) of a video signal (VS) sent by the first communication device to the second communication device, said frequency being adapted as a function of a noise signal (NS) included in an audio signal (AS), said video signal (VS) and said audio signal (AS) having been sent by said second communication device to said first communication device.

* * * * *